United States Patent
Ji et al.

(10) Patent No.: US 9,690,372 B2
(45) Date of Patent: Jun. 27, 2017

(54) DISPLAY DEVICE, DISPLAY METHOD AND DISPLAY APPARATUS

(71) Applicant: BOE Technology Group Co., Ltd., Beijing (CN)

(72) Inventors: Chunyan Ji, Beijing (CN); Wenbo Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 132 days.

(21) Appl. No.: 14/568,800

(22) Filed: Dec. 12, 2014

(65) Prior Publication Data

US 2016/0011655 A1    Jan. 14, 2016

(30) Foreign Application Priority Data

Jul. 11, 2014 (CN) .......................... 2014 1 0331650

(51) Int. Cl.
*G06F 3/0481* (2013.01)
*G02F 1/1335* (2006.01)
(Continued)

(52) U.S. Cl.
CPC .............. *G06F 3/011* (2013.01); *G09G 3/20* (2013.01); *G09G 3/3208* (2013.01);
(Continued)

(58) Field of Classification Search
CPC ............. G06F 3/0481; G02F 1/133606; G02F 1/133528
(Continued)

(56) References Cited

U.S. PATENT DOCUMENTS 5,652,918 A * 7/1997 Usui .................. G03B 5/00
                                           348/208.2
2005/0180740 A1* 8/2005 Yokoyama ............ G06F 1/1626
                                           396/421
(Continued)

FOREIGN PATENT DOCUMENTS

CN          1949842 A      4/2007
CN        103024163 A      4/2013
(Continued)

OTHER PUBLICATIONS

Zhang, Patent Translation of CN1949842, Apr. 18, 2007, p. 1-9.*
(Continued)

*Primary Examiner* — Gregory J Tryder
*Assistant Examiner* — Yi Yang
(74) *Attorney, Agent, or Firm* — Westman, Champlin & Koehler, P.A.

(57) ABSTRACT

An embodiment of the present invention provides a display device, a display method and a display apparatus that may control a user to play electronic products at a suitable distance and avoid myopia of the user. The display device comprises: a distance sensor, a display screen, a controller, and a fuzzy processing device, wherein the distance sensor is configured to determine the distance between a user of the display device and the display screen, and wherein the controller is configured to control the fuzzy processing device when the distance between the user of the display device and the display screen is not greater than a predetermined value such that the fuzzy processing device carries out a fuzzy process on the image picture displayed on the display screen and the processed image picture is demonstrated to the user of the display device.

16 Claims, 8 Drawing Sheets

(51) Int. Cl.
*G06F 3/01* (2006.01)
*G09G 3/20* (2006.01)
*G09G 3/3208* (2016.01)
*G09G 3/36* (2006.01)

(52) U.S. Cl.
CPC ... *G09G 3/3611* (2013.01); *G09G 2320/0606* (2013.01); *G09G 2320/0626* (2013.01); *G09G 2354/00* (2013.01)

(58) Field of Classification Search
USPC ................................. 345/647; 349/64, 96
See application file for complete search history.

(56) References Cited

U.S. PATENT DOCUMENTS

| | | | |
|---|---|---|---|
| 2008/0239202 A1* | 10/2008 | Won | G02F 1/133611 349/64 |
| 2009/0096364 A1* | 4/2009 | Fujii | H01L 51/0004 313/504 |
| 2009/0160655 A1 | 6/2009 | Chen | |
| 2010/0277676 A1* | 11/2010 | Uwada | B32B 27/08 349/102 |
| 2010/0302481 A1* | 12/2010 | Baum | B29D 11/00634 349/96 |
| 2011/0051053 A1* | 3/2011 | Okamura | G02B 3/0056 349/96 |
| 2011/0298361 A1* | 12/2011 | Matsunaga | G02B 5/0242 313/504 |
| 2012/0154390 A1* | 6/2012 | Narita | H04N 13/0022 345/419 |
| 2013/0207962 A1* | 8/2013 | Oberdorfer | G06F 3/013 345/419 |
| 2013/0335943 A1* | 12/2013 | Shibazaki | G02B 5/0278 362/19 |

FOREIGN PATENT DOCUMENTS

| | | |
|---|---|---|
| CN | 103072451 A | 5/2013 |
| CN | 103677135 A | 3/2014 |

OTHER PUBLICATIONS

Li, Patent Translation of CN103024163, Apr. 3, 2013, p. 1-9.*
First Office Action, including Search Report, for Chinese Patent Application No. 201410331650.4, dated Nov. 3, 2015, 14 pages.

* cited by examiner

Fig.1

OFF state

Fig.2a

ON state

| upper polarizer | — 66 |
| No.4 electrode | — 37 |
| liquid crystal and macromolecule polymer mixture layer | — 36 |
| No. 3 electrode | — 35 |
| color filter substrate | — 65 |
| liquid crystal layer | — 64 |
| array substrate | — 63 |
| lower polarizer | — 62 |
| backlight unit | — 61 |

Fig.7

| upper polarizer | — 66 |
| color filter substrate | — 65 |
| liquid crystal layer | — 64 |
| array substrate | — 63 |
| No.4 electrode | — 37 |
| liquid crystal and macromolecule polymer mixture layer | — 36 |
| No. 3 electrode | — 35 |
| lower polarizer | — 62 |
| backlight unit | — 61 |

DISPLAY DEVICE, DISPLAY METHOD AND DISPLAY APPARATUS

CROSS-REFERENCE TO RELATED APPLICATION

This application claims the benefit of Chinese Patent Application No. 201410331650.4 filed on Jul. 11, 2014 in the State Intellectual Property Office of China, the whole disclosure of which is incorporated herein by reference.

BACKGROUND OF THE INVENTION

Field of the Invention

The present disclosure relates to the technical field of display, in particular, relates to a display device, a display method and a display apparatus.

Description of the Related Art

The conventional electronic products cannot control a user to play it at a suitable distance. Thus, upon playing the electronic products, the user tends to become tired in eyes if he is too close to the electronic products. It may cause myopia of the user.

SUMMARY OF THE INVENTION

In order to deal with the above and other aspects in the prior art, an embodiment of the present invention provides a display device comprising:

a distance sensor, a display screen, a controller and a fuzzy processing device, wherein the distance sensor is configured to determine the distance between a user of the display device and the display screen, the display screen being configured to display an image picture, and wherein the controller is configured to control the fuzzy processing device when the distance between the user of the display device and the display screen is not greater than a predetermined value such that the fuzzy processing device carries out a fuzzy process on the image picture displayed on the display screen and the processed image picture is demonstrated to the user of the display device.

An embodiment of the present invention provides a display method comprising:

acquiring a distance between a user of the display device and a display screen determined by a distance sensor;

controlling a fuzzy processing device when the distance between the user and the display screen is not greater than a predetermined value such that the fuzzy processing device carries out a fuzzy process on an image picture displayed on the display screen and the processed image picture is demonstrated to the user of the display device.

An embodiment of the present invention provides a display apparatus comprising:

an acquiring unit configured to acquire a distance between a user of the display device and a display screen determined by a distance sensor, a judging and controlling unit configured to control a fuzzy processing device when the distance between the user of the display device and the display screen is not greater than a predetermined value such that the fuzzy processing device carries out a fuzzy process on an image picture displayed on the display screen and the processed image picture is demonstrated to the user of the display device, and configured to control the fuzzy processing device when the distance between the user and the display screen is greater than the predetermined value such that the fuzzy processing device stops the fuzzy process on the image picture.

DETAILED DESCRIPTION OF PREFERRED EMBODIMENTS OF THE INVENTION

The display device, display method and display apparatus provided by embodiments of the present invention may determine the distance between the user and the display device, and allow the fuzzy processing device to carry out the fuzzy process on an image picture displayed on the display screen when the distance between the user and the display device is not greater than a predetermined value. The processed image picture is demonstrated to the user of the display device such that the display picture seen by the user becomes fuzzy so as to reminder the user to view the picture at a suitable distance for protecting eyes of the user.

The detailed description of the display device, display method and display apparatus provided by embodiments of the present invention will be explained with reference to figures.

Figure 1:
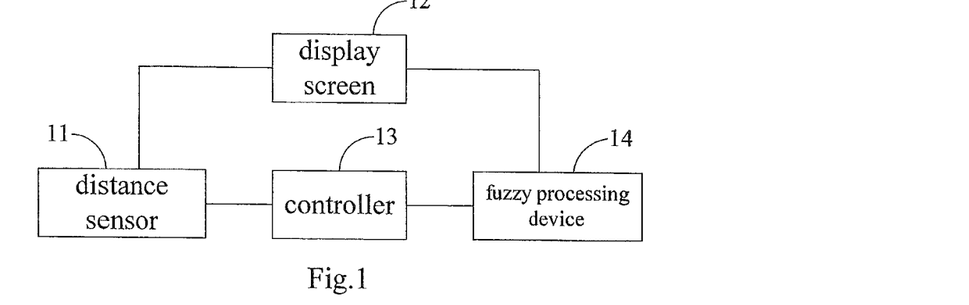
FIG. 1 is a structural schematic view showing a display device according to an embodiment of the present invention.

The display device according to an embodiment of the present invention, as illustrated in FIG. 1, includes: a distance sensor 11, a display screen 12, a controller 13 and a fuzzy processing device 14. The distance sensor 11 is configured to determine the distance between a user of the display device and the display screen 12. The display screen 12 is configured to display an image picture. The controller 13 is configured to control the fuzzy processing device 14 when the distance between the user of the display device and the display screen 12 is not greater than a predetermined value such that the fuzzy processing device 14 carries out a fuzzy process on the image picture displayed on the display screen and the processed image picture is demonstrated to the user of the display device. In this way, the user will not see the image picture displayed on the display screen clearly, thus the user will have to keep a sufficient distance from the display screen.

In an example, the distance sensor is arranged on a front face of the display screen. Preferably, the distance sensor may be located at the middle position of the upper frame or the lower frame of the display screen. The image picture is demonstrated through the front face of the display screen to the user of the display device.

The predetermined value may be set in advance as required. Generally, for TV, the predetermined value may be 3 meters; for a computer, it may be 0.5 meter; and for a tablet computer, it may be 0.3 meter.

In an example, the controller 13 is further configured to control the fuzzy processing device when the distance between the user and the display screen 12 is greater than the predetermined value such that the fuzzy processing device 14 stops the fuzzy process on the image picture.

In this way, after the user of the display device adjusts the distance from the display screen, the fuzzy processing device may not carry out the fuzzy process on the image picture on the display screen any longer such that the image picture demonstrated by the display device becomes clear again.

In an example, the controller 13 is further configured to control the fuzzy processing device 14 when the distance between the user and the display screen 12 is not greater than the predetermined value such that the fuzziness of the image picture displayed on the display screen 12 increases as the distance between the user and the display screen 12 is reduced. In this way, the fuzziness extent may be adjusted on basis of the distance in order to improve the effects of remaindering the user.

Optionally, the controller 13 is further configured to control the fuzzy processing device 14 to diffuse the light emitted from the display screen 12 when the distance between the user and the display screen 12 is not greater than the predetermined value, such that the picture on the display device seen be the user is fuzzy. In contrast, the controller 13 is also configured to control the fuzzy processing device 14 to stop diffusing the light emitted from the display screen 12 when the distance between the user and the display screen 12 is greater than the predetermined value, such that the picture on the display device seen be the user becomes clear.

That is, the fuzzy processing device may have the function of diffusing the light emitted from the display screen uniformly so as to destroy the luminance distribution and polarization distribution of light sources required for displaying the picture such that the image becomes fuzzy. Alternatively, the fuzzy processing device may be converted into a light transmission device to keep the luminance distribution and polarization distribution of light sources required for displaying the picture so as to keep the desired resolution of the image. The fuzzy processing device may be a photoelectric element composed of liquid crystal/macromolecule composite materials, or may be such as an electrochromic device, an electrowetting device, a charged particle device having the above function, or may be a light guide having a nanostructure and high transmission.

When the fuzzy processing device is a photoelectric element composed of liquid crystal/macromolecule composite materials, the fuzzy processing device includes such as a positive polymer dispersed liquid crystal (PDLC) device, a negative polymer dispersed liquid crystal device, a polymer network liquid crystal (PNLC) device and a macromolecule stabilized cholesteric texture (PSCT) liquid crystal device, but it is not limited to the above devices.

In an example, the positive PDLC device is formed by mixing macromolecule polymers with nematic liquid crystal at a certain proportion and injecting it into a liquid crystal cell to perform a polyreaction to cause separation of the macromolecule polymer from the liquid crystal molecules and to converge the liquid crystal molecules to form liquid crystal droplets and dispersing these liquid crystal droplets among the macromolecule polymers. The liquid crystal and doping agents occupy 90%-99% of the total weight while the macromolecules and light initiating agents occupy 1-10%, which may be adjusted in practice as required.

Figure 2A:
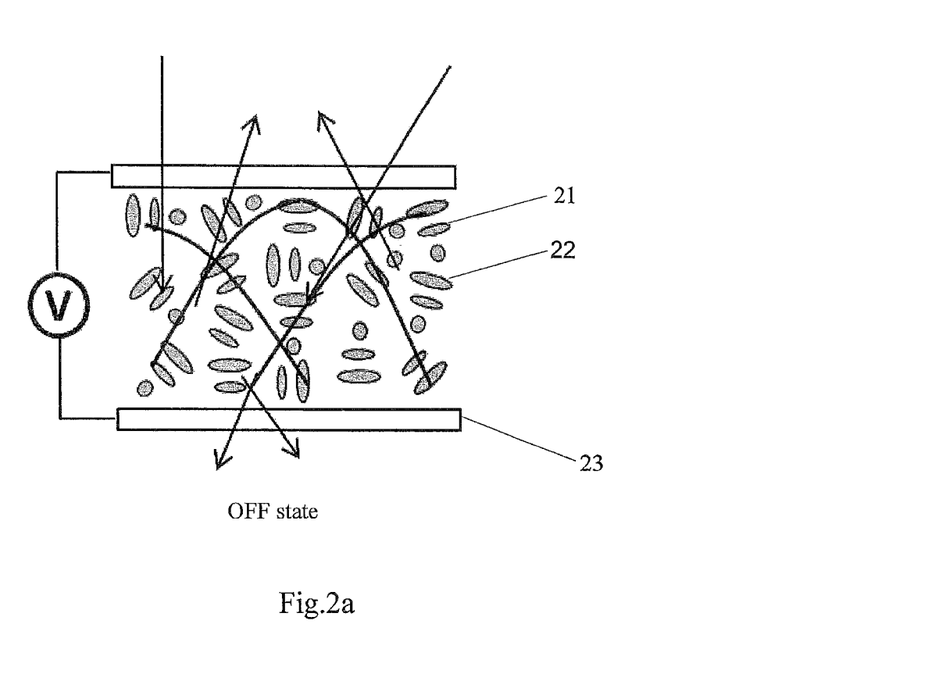
FIG. 2a and FIG. 2b are schematic views showing how a positive polymer dispersed liquid crystal device processes a light with an electrical field and without the electrical field.
Figure 2B:
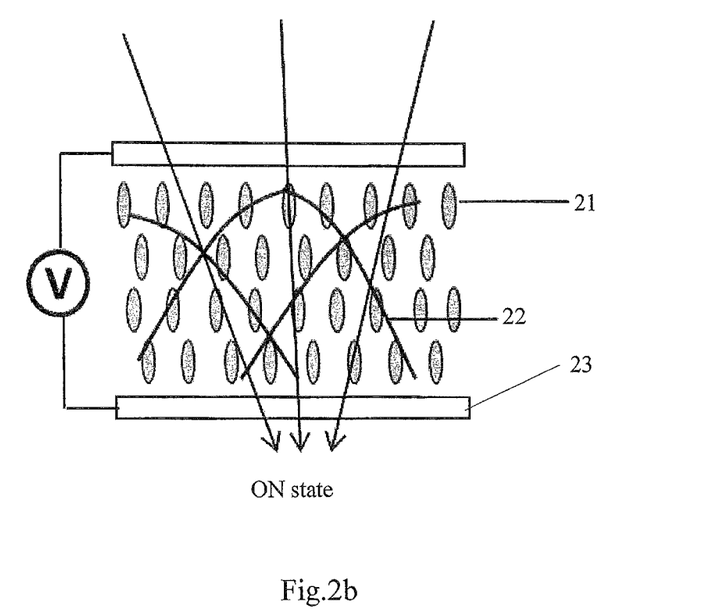

As illustrated in FIG. 2a, when no electrical fields are applied to the positive PDLC device, i.e., in the OFF state, the liquid crystal molecules 21 are aligned arbitrarily in the positive PDLC device. As they have property of optical and dielectric anisotropy, their effective refractivity will not be matched to that of the macromolecule polymers 22 and scattering will occur between the liquid crystal molecules 21 and the macromolecule polymers 22 to form a fog state (fuzzy state). As illustrated in FIG. 2b, when an electrical field is applied to the positive PDLC device, i.e., in the ON state, all of the liquid crystal molecules 21 are aligned in parallel. Thus, the refractivity of the macromolecule polymers 22 is identical to the ordinary light refractivity of the liquid crystal molecules 21 and scattering will not occur between the liquid crystal molecules 21 and the macromolecule polymers 22 to form a bright state (clear state). In FIGS. 2a and 2b, the electrode 23 of the positive PDLC device is also provided.

The fuzzy processing device may be arranged outside of the display screen, or integrated with the display screen. In an example, the display screen includes, but not limited to, an organic light emitting diode display screen, a liquid crystal display screen, a plasma display screen, a cathode ray tube display screen.

Figure 2C:
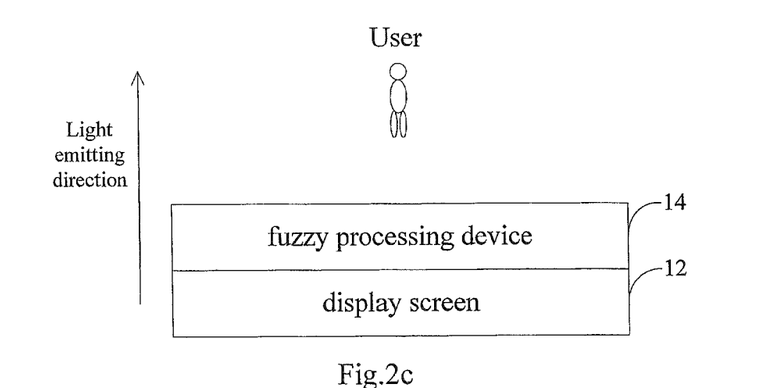
FIG. 2c shows a positional relationship between a fuzzy processing device and a display screen when the fuzzy processing device is outside the display screen.

When the fuzzy processing device is arranged outside of the display screen, i.e., in the external, it may be arranged along the direction in which the light is emitted from the display screen and located between the user which is viewing the image picture of the display device and the display screen so as to allow the light to pass through the fuzzy processing device after it has been fuzzed or allow the light to pass through the fuzzy processing device directly. FIG. 2c shows a positional relationship between the fuzzy processing device and the display screen when the fuzzy processing device is located outside of the display screen.

The display screen will be explained below only with reference to a top emission organic light emitting diode display screen and a bottom emission organic light emitting diode display screen. For other kinds of display screens, the external arrangement of the fuzzy processing device is similar, and thus the detailed description will be omitted.

When the display screen is an organic light emitting diode display screen, the fuzzy processing device may be arranged on the side of the display screen, on which an electroluminescent layer emits an emergent light. The fuzzy processing device may be arranged in the display screen or out of the display screen. That is, the fuzzy processing device may be arranged perpendicular to the direction in which the light is emitted from the display screen and located at any position between the user which is viewing the image picture of the display device and the electroluminescent layer in the display screen.

Figure 3:
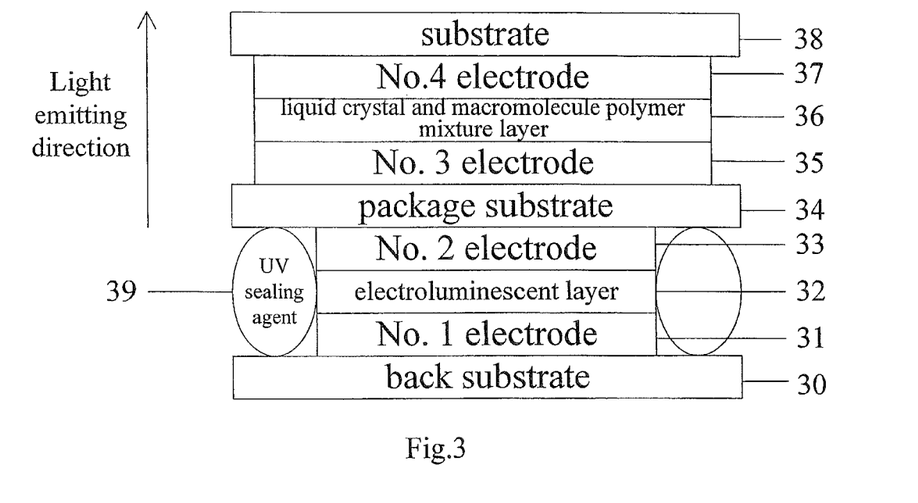
FIGS. 3-5 show positional relationships between the fuzzy processing device and the display screen when the display screen is an organic light emitting diode display screen.
Figure 4:
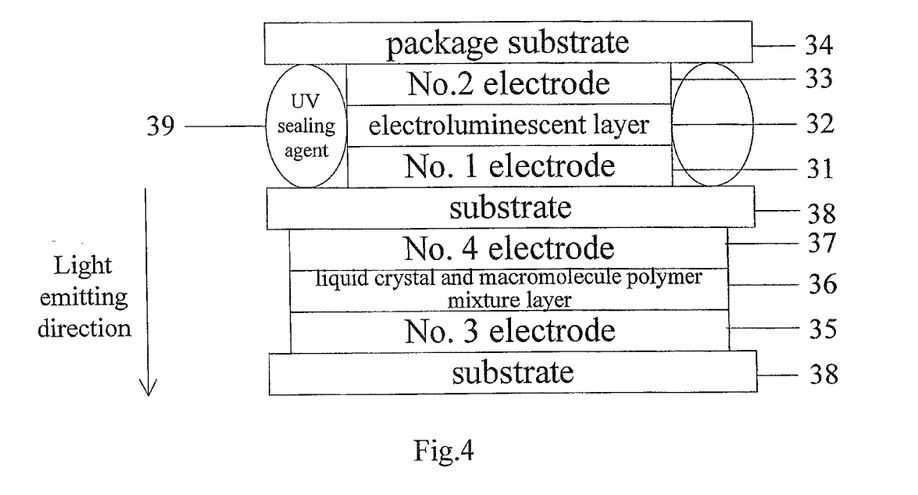

The fuzzy processing device is located outside of the display screen and arranged in a light emitting direction of the display screen. When the display screen is the top emission organic light emitting diode display screen, a package substrate 34 in the display screen is one substrate of the fuzzy processing device, as shown in FIG. 3. When the display screen is a bottom emission organic light emitting diode display screen, a back substrate in the display screen is one substrate 38 of the fuzzy processing device, as shown in FIG. 4. In FIGS. 3-4, the fuzzy processing device is the positive PDLC device.

In FIG. 3, one substrate of the fuzzy processing device is common to the package substrate 34 of the top emission organic light emitting diode display screen, that is, the package substrate 34 may be used as one substrate of the fuzzy processing device. In FIG. 3, the fuzzy processing device is the positive PDLC device. In an example, the top emission organic light emitting diode display screen includes: a back substrate 30, No. 1 electrode 31, an electroluminescent layer 32, No. 2 electrode 33, a package substrate 34 and UV sealing agent 39. The fuzzy processing device includes: a package substrate 34, No. 3 electrode 35, a liquid crystal and macromolecule polymer mixture layer 36, No. 4 electrode 37 and a substrate 38.

In FIG. 4, one substrate of the fuzzy processing device is common to the back substrate of the bottom emission organic light emitting diode display screen, that is, the substrate 38 (the substrate 38 adjacent to the No. 1 electrode 31) in FIG. 4 is also used as the back substrate of the organic light emitting diode display screen. In FIG. 4, the fuzzy processing device is the positive PDLC device. In an example, the bottom emission organic light emitting diode display screen includes: the substrate 38 (the substrate 38 adjacent to the No. 1 electrode 31), No. 1 electrode 31, an electroluminescent layer 32, No. 2 electrode 33, a package substrate 34 and UV sealing agent 39. The fuzzy processing device includes: the substrate 38 (the substrate 38 adjacent to the No. 3 electrode 35), No. 3 electrode 35, a liquid crystal and macromolecule polymer mixture layer 36, No. 4 electrode 37 and a substrate 38 (the substrate 38 adjacent to the No. 1 electrode 31).

The embodiment in which the fuzzy processing device is integrated in the display screen, that is, integrated together will be explained below only with reference to the case that the display screen is a top emission organic light emitting diode display screen or a liquid crystal display screen. For other kinds of display screens, the integrated arrangement of the fuzzy processing device is similar, and thus the detailed description will be omitted.

Figure 5:
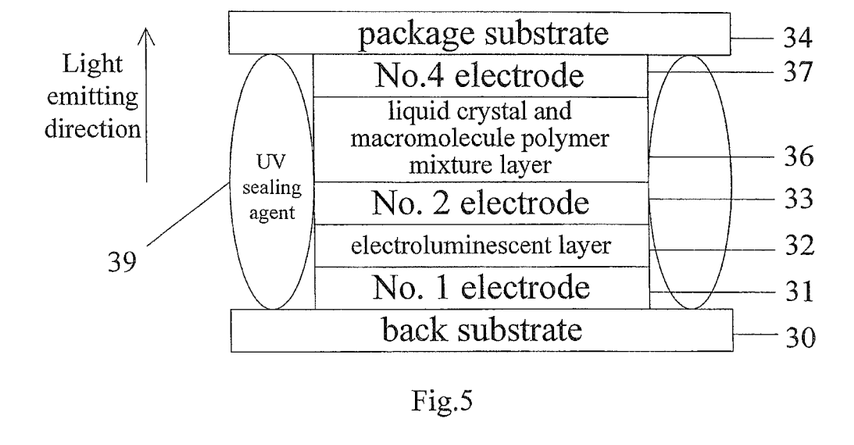

When the fuzzy processing device is a positive polymer dispersed liquid crystal device and integrated in a top emission organic light emitting diode display screen, the display device according to an embodiment of the present invention, as shown in FIG. 5, comprises: a back substrate 30, a first electrode (i.e., No. 1 electrode 31) on the back substrate 30, an electroluminescent layer 32 on the first electrode (i.e., No. 1 electrode 31), a second electrode (i.e., No. 2 electrode 33) on the electroluminescent layer 32, a liquid crystal and macromolecule polymer mixture layer 36 on the second electrode (i.e., No. 2 electrode 33), a third electrode (i.e., No. 4 electrode 37) on the liquid crystal and macromolecule polymer mixture layer 36 and a package substrate on the third electrode (i.e., No. 4 electrode 37). In this way, two substrates of the fuzzy processing device are omitted, that is, in FIG. 5, the back substrate 30 and the package substrate 34 are shared by the fuzzy processing device and the top emission organic light emitting diode display screen. In addition, the semi-transparent cathode, i.e., the No. 2 electrode 33 of the top emission organic light emitting diode display screen is also common to one electrode, i.e., No. 3 electrode of the fuzzy processing device. Thus, the top emission organic light emitting diode display screen includes: No. 1 electrode 31, an electroluminescent layer 32 and No. 2 electrode 33. The fuzzy processing device includes No. 2 electrode 33, the liquid crystal and macromolecule polymer mixture layer 36 and the fourth electrode 37. Further, both the top emission organic light emitting diode display screen and the fuzzy processing device include the back substrate 30, the package substrate 34 and UV sealing agents.

When the display screen is a liquid crystal display screen, the fuzzy processing device is arranged on the side of a lower polarizer of the display screen facing a color filter substrate of the display screen, the lower polarizer being located on the side of an array substrate of the display screen facing away from the color filter substrate of the display screen. The fuzzy processing device may be arranged in the display screen or out of the display screen. That is, the fuzzy processing device may be arranged at any positions between the lower polarizer in the display screen and the user which is viewing the real image picture of the display device.

Figure 6:
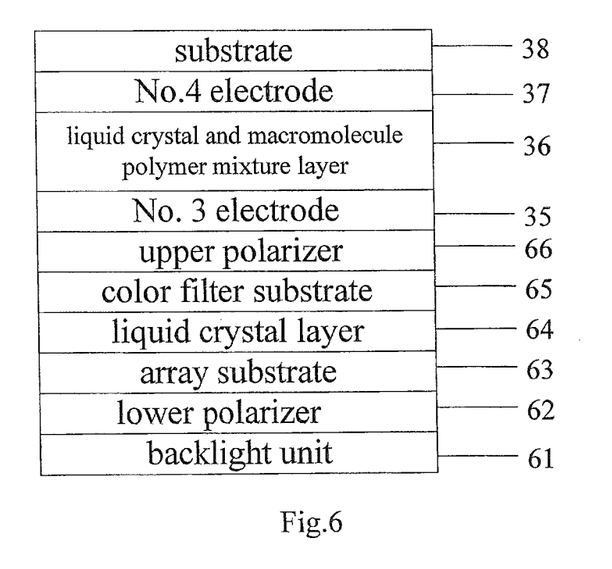
FIGS. 6-8 show positional relationships between the fuzzy processing device and the display screen when the display screen is a liquid crystal display screen.

When the backlight unit of the display screen is located on the side of the lower polarizer of the display screen facing away from the array substrate of the display screen, as shown in FIG. 6, the fuzzy processing device is arranged on the side of an upper polarizer 66 of the display screen facing away from the color filter substrate 65 of the display screen and the upper polarizer 66 in the display screen is one substrate of the fuzzy processing device. In an example, the upper polarizer 66 is located on the side of the array substrate 63 of the display screen facing the color filter substrate 65 of the display screen.

In FIG. 6, the fuzzy processing device is located on the upper surface of the upper polarizer 66 of the liquid crystal screen. In FIG. 6, the fuzzy processing device includes: No. 3 electrode 35, the liquid crystal and macromolecule polymer mixture layer 36, the No. 4 electrode 37 and the substrate 38. The upper polarizer 66 is used as another substrate of the fuzzy processing device. The liquid crystal display screen includes: a backlight unit 61, a lower polarizer 62, an array substrate 63, a liquid crystal layer 64, a color filter substrate 65 and an upper polarizer 66. In FIG. 6, the fuzzy processing device is the positive PDLC device.

Figure 7:
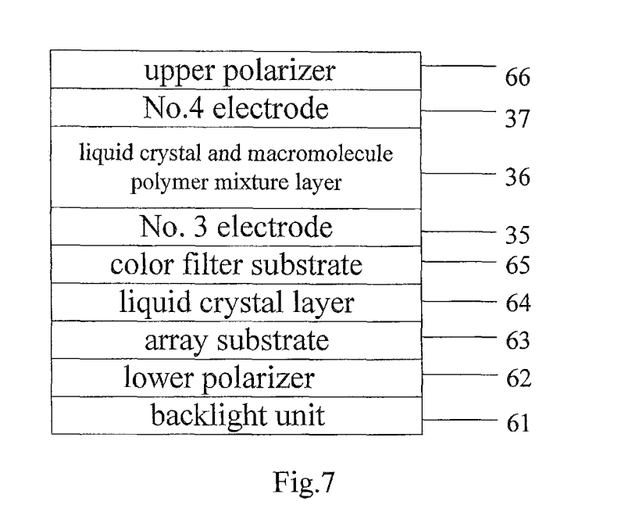
Figure 8:
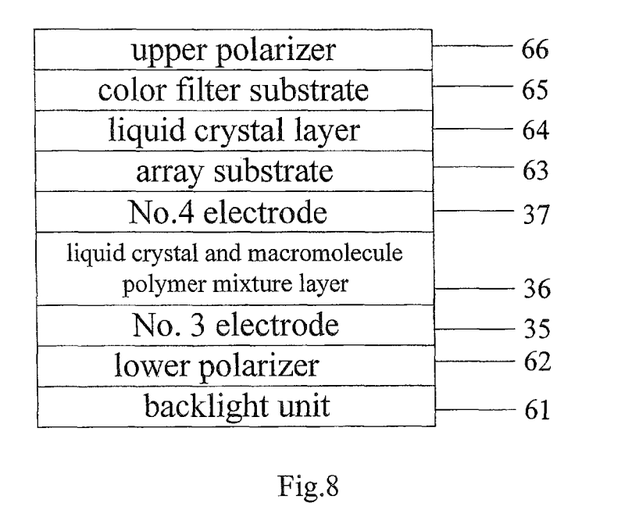

When the fuzzy processing device is integrated in the liquid crystal screen, if the fuzzy processing device is a positive polymer dispersed liquid crystal device, as shown in FIG. 7, the display device comprises: a backlight unit 61, the lower polarizer 62 on the backlight unit 61, the array substrate 63 on the lower polarizer 62, a liquid crystal layer 64 on the array substrate 63, the color filter substrate 65 on the liquid crystal layer 64, a fourth electrode (i.e. No. 3 electrode 35) on the color filter substrate 65, a liquid crystal and macromolecule polymer mixture layer 36 on the fourth electrode (i.e. No. 3 electrode 35), a fifth electrode (i.e. No. 4 electrode 37) on the liquid crystal and macromolecule polymer mixture layer 36 and an upper polarizer 66 on the fifth electrode (i.e. No. 4 electrode 37); or, as shown in FIG. 8, the display device comprises: a backlight unit 61, the lower polarizer 62 on the backlight unit 61, a sixth electrode (i.e. No. 3 electrode 35) on the lower polarizer 62, a liquid crystal and macromolecule polymer mixture layer 36 on the sixth electrode (i.e. No. 3 electrode 35), a seventh electrode (i.e. No. 4 electrode 37) on the liquid crystal and macromolecule polymer mixture layer 36, the array substrate 63 on the seventh electrode (i.e. No. 4 electrode 37), a liquid crystal layer 64 on the array substrate 63, the color filter substrate 65 on the liquid crystal layer 64 and an upper polarizer 66 on the color filter substrate 65.

In FIG. 7, the fuzzy processing device is located between the color filter substrate 65 and the upper polarizer 66 of the liquid crystal screen. In FIG. 7, the fuzzy processing device includes: No. 3 electrode 35, the liquid crystal and macromolecule polymer mixture layer 36 and the No. 4 electrode 37. The upper polarizer 66 and the color filter substrate 65 are two substrates of the fuzzy processing device. The liquid crystal display screen includes: a backlight unit 61, a lower polarizer 62, an array substrate 63, a liquid crystal layer 64, a color filter substrate 65 and an upper polarizer 66.

In FIG. 8, the fuzzy processing device is located between the array substrate 63 and the lower polarizer 62 of the liquid crystal screen. In FIG. 8, the fuzzy processing device includes: No. 3 electrode 35, the liquid crystal and macromolecule polymer mixture layer 36 and the No. 4 electrode 37. The lower polarizer 62 and the array substrate 63 are two substrates of the fuzzy processing device. The liquid crystal display screen includes: a backlight unit 61, a lower polarizer 62, an array substrate 63, a liquid crystal layer 64, a color filter substrate 65 and an upper polarizer 66.

The relative position between the fuzzy processing device and the liquid crystal display screen includes, but not limited to, three conditions shown in FIGS. 6-8.

As an example, the distance sensor in the display device according to an embodiment of the present invention may be an optical displacement sensor, for example, the distance sensor may be an infrared sensor.

Figure 9:
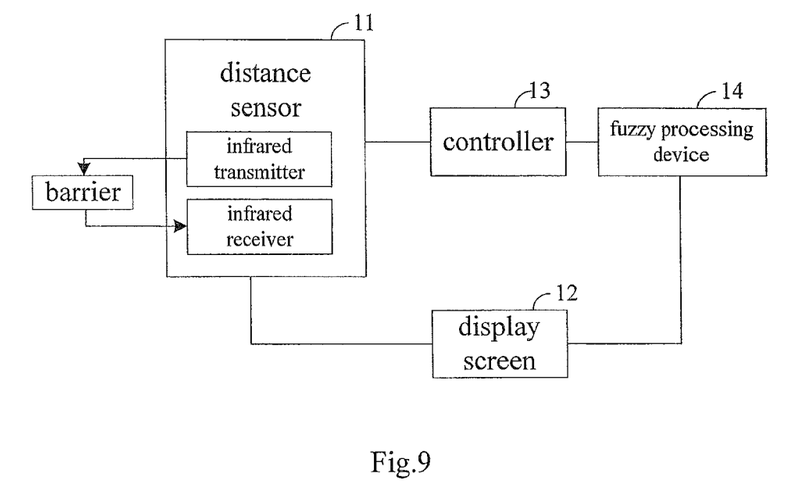
FIG. 9 is a structural schematic view showing a display device according to an embodiment of the present invention when the distance sensor is an infrared sensor.

When the distance sensor is an infrared sensor, the structure of the display device according to an embodiment of the present invention is illustrated in FIG. 9. In the example, the distance sensor includes an infrared transmitter and an infrared receiver. In use, the infrared transmitter is configured to transmit an infrared light signal and the infrared receiver is configured to receive the infrared light signal reflected by a barrier. The distance between the user and the display screen may be calculated from the period from the time at which the infrared light signal is transmitted to the time at the infrared light signal reflected by the barrier (the body of the user). The period may be measured. When the barrier (such as human body) is in front of the display screen in the infrared detection direction, the infrared light signal is reflected back and received by the infrared receiver, and is processed to obtain the distance between the barrier and the display screen. It may be controlled and determined whether the distance is larger than a predetermined value in memory, and the fuzzy processing device may be controlled on basis of the determination results. The predetermine value may be recorded in such as RAMs, registers. The controller may be a central process unit or a microcontroller on the main board of a TV, a computer or a tablet computer, or may be an internal control unit of the infrared sensor.

Of course, the distance sensor is not limited to the infrared sensor and light sensor as long as it may have the function of measuring the distance.

However, if the sensor can only detect the distance between the barrier and the display screen, a false tends to occur. For example, when other body part of the user is close to the display screen, the picture displayed on the display device may become fuzzy. Therefore, as an example, in the display device according to the embodiment of the present invention, the distance sensor is arranged on a front face of the display screen, and the display device further comprises a human body part recognition device configured to recognize a special part of the user, for example, a face of the user who is viewing the image picture on the display device, or eyes.

As the user may adjust the angle of the display screen upon using the display device, such that the display screen may be inclined forwardly or backwardly. Thus, as an example, the distance sensor is configured to detect the distance between the special part of the user and a focal point of view lines of the user. The focal point of view lines of the user is an intersection point of the view lines of the user with the front face of the display screen, the display screen demonstrates the image picture to the user through the front face of the display screen.

The conventional distance sensor typically can only calculate the distance between the human and the display screen in the vertical direction or the distance between the human and a fixed point or line on the display screen. When the display screen rotates forwardly or backwardly, view lines of the eyes will not be fixed. Thus, in this case, the conventional algorithms have not been suitable. The view lines of the eyes typically move in a region. In fact, when the display screen rotates, normally, majority of the focal points of the view lines of the eyes will tend to fall within a central region of the display screen instead of the position in which view lines of the eyes are perpendicular to the front face of the display screen. It will do this if the user does not face the center of the display screen. Therefore, the effective distance from the user to the display screen should be the distance between the special part of the user and the focal point of the view lines of the user.

The best view range of the eyes is a central region of the display screen. Thus, if the distance between the special part of the user and the focal point of the view lines of the user is determined, the distance between the central region of the display screen and the special part of the user, for example eyes is determined. In the embodiment of the present invention, the distance sensor has the functions of eye recognition (face recognition) and view lines track. Even if the view lines of the user move in a small range on the display screen, the distance sensor will still be able to acquire the position information of the focal point of the view lines of the user on the front face of the display screen.

When the eyes view along different directions, they may change slightly. The change of eyes may produce extractable features which may be extracted by imaging captures or scanning of a computer. The view lines of eyes track may be achieved by moving through tracking the position of the pupil center. After a camera scans the image of eyes, reference coordinates may be established by generating coordinates. The position coordinates of the pupils of eyes may be determined by calibration and algorithm conversion based on the reference coordinates. The position information of the focal point of the view lines of the user on the front face of the display screen may be finally obtained by recognizing the position of the pupil center with respect to its position when the eyes face forwardly.

Therefore, the distance sensor in the embodiment of the present invention needs to acquire the positional information of the focal points of view lines of the user on the front face of the display screen. In this way, the distance from the distance sensor to the focal point of the view lines of the user may be acquired on basis of the positional information of the focal points of view lines of the user. The distance sensor may be able to measure directly the distance between the distance sensor and the special part of the user and able to measure an angle between the connecting line of the distance sensor and the special part of the user and the connecting line of the distance sensor and the focal point of view lines of the user.

Figure 10:
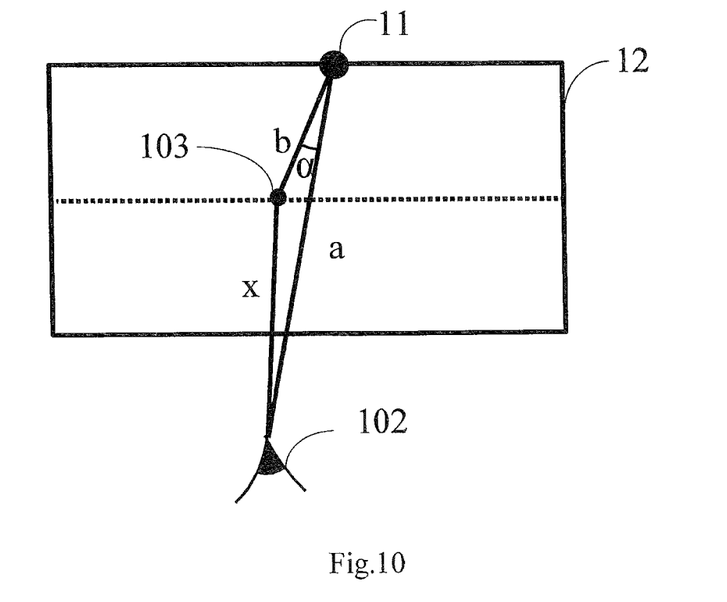
FIG. 10 is a schematic view showing how the distance sensor detects the distance between a special part of the user and the focal point of view lines of the user.

As an example, as shown in FIG. 10, the distance sensor 11 is configured to detect the distance a between the special part 102 of the user and the distance sensor 11 and to detect a first angle a and the distance b between the distance sensor 11 and the focal point 103 of view lines of the user. The first angle a is the angle between the connecting line of the distance sensor 11 and the special part 102 of the user and the connecting line of the distance sensor 11 and the focal point 103 of view lines of the user. The distance x between the special part 102 of the user and the focal point of view lines of the user is determined depending on the first angle a, the distance a between the special part 102 of the user and the distance sensor 11 and the distance b between the distance sensor 11 and the focal point 103 of view lines of the user.

In FIG. 10, with reference to the embodiment that the distance sensor is located at the upper frame of the front face of the display screen, $x=\sqrt{a^2+b^2-2ab\cos\alpha}$. In this way, the distance sensor may monitor the user indeed to view the image picture in a health manner to prevent myopia.

Figure 11:
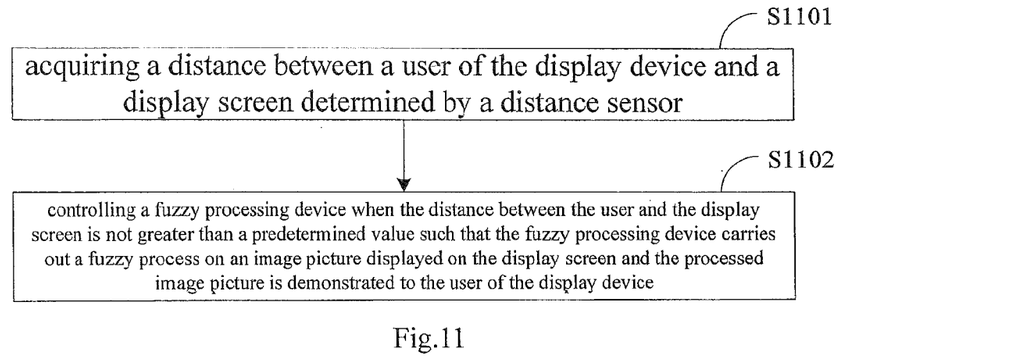
FIG. 11 is a first flow chart showing a display method according to an embodiment of the present invention.

An embodiment of the present invention provides a display method, as shown in FIG. 11, comprising:

S1101: acquiring a distance between a user of the display device and a display screen determined by a distance sensor;

S1102: controlling a fuzzy processing device when the distance between the user and the display screen is not greater than a predetermined value such that the fuzzy processing device carries out a fuzzy process on an image picture displayed on the display screen and the processed image picture is demonstrated to the user of the display device. In this way, the user will not see the image picture displayed on the display screen clearly, thus the user will have to keep a sufficient distance from the display screen.

In an example, the distance sensor is arranged on the front face of the display screen. Preferably, the distance sensor may be located at the middle position of the upper frame or the lower frame of the display screen. The image picture is demonstrated through the front face of the display screen to the user of the display device.

The predetermined value may be set in advance as required. Generally, for TV, the predetermined value may be 3 meters; for a computer, it may be 0.5 meter; and for a tablet computer, it may be 0.3 meter.

Figure 12:
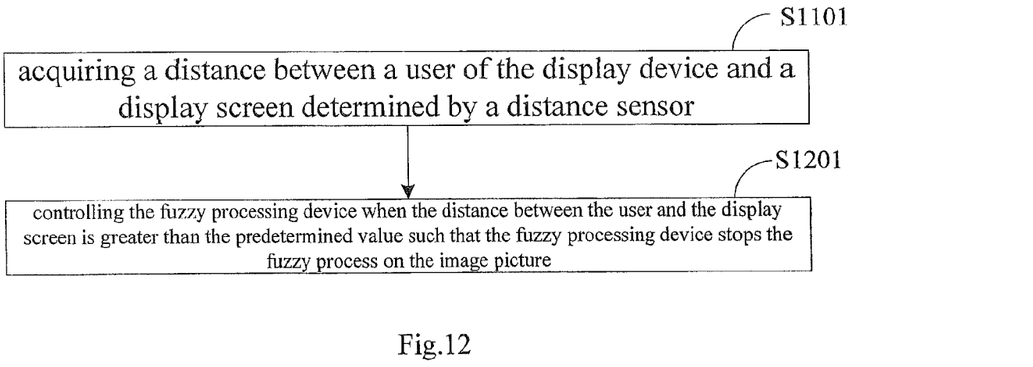
FIG. 12 is a second flow chart showing a display method according to an embodiment of the present invention.

Further, an embodiment of the present invention provides a display method, as shown in FIG. 12, comprising:

S1201: controlling the fuzzy processing device when the distance between the user and the display screen is greater than the predetermined value such that the fuzzy processing device stops the fuzzy process on the image picture.

In this way, after the user of the display device adjusts the distance from the display screen, the fuzzy processing device may not carry out the fuzzy process on the image picture on the display screen any longer such that the image picture demonstrated by the display device becomes clear again.

Figure 13:
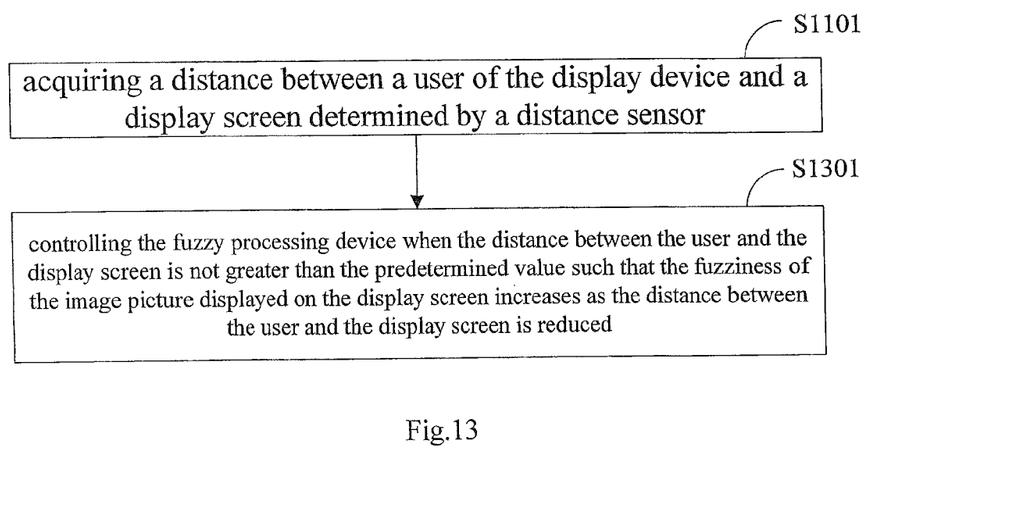
FIG. 13 is a third flow chart showing a display method according to an embodiment of the present invention.

Further, an embodiment of the present invention provides a display method, as shown in FIG. 13, further comprising:

S1301: controlling the fuzzy processing device when the distance between the user and the display screen is not greater than the predetermined value such that the fuzziness of the image picture displayed on the display screen increases as the distance between the user and the display screen is reduced.

Figure 14:
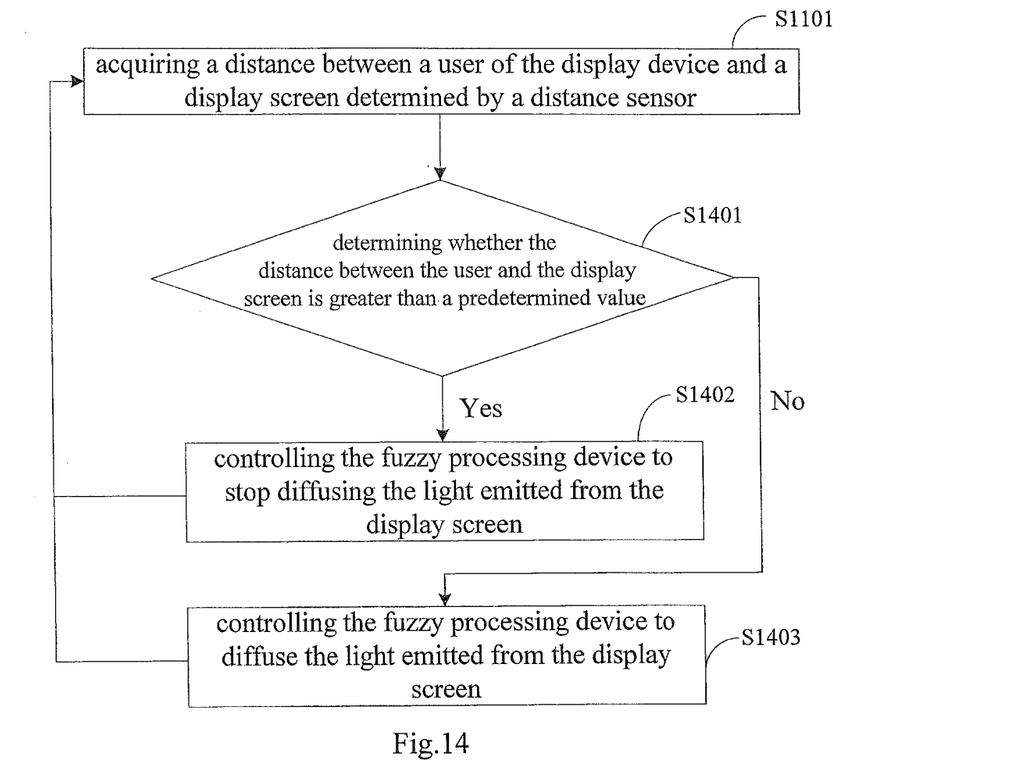
FIG. 14 is a fourth flow chart showing a display method according to an embodiment of the present invention.

Optionally, an embodiment of the present invention provides a display method, as shown in FIG. 14, comprising:

S1101: acquiring a distance between a user of the display device and a display screen determined by a distance sensor;

S1401: determining whether the distance between the user and the display screen is greater than a predetermined value, and going to S1402 if yes, otherwise, going to S1403 if no;

S1402: controlling the fuzzy processing device to stop diffusing the light emitted from the display screen such that the picture displayed on the display device is clear;

S1403: controlling the fuzzy processing device to diffuse the light emitted from the display screen such that the picture displayed on the display device is fuzzy;

S1101 will be performed again after the S1402 or S1403 is done.

On basis of the same invention concept, an embodiment of the present invention also provides a display apparatus. Since the principle of the display apparatus is similar to the above display method, the explanations for the same parts will be omitted.

Figure 15:
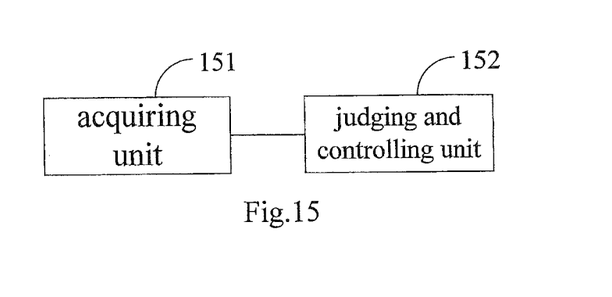
FIG. 15 is a schematic view showing a structure of a display apparatus according to an embodiment of the present invention.

An embodiment of the present invention provides a display apparatus, as illustrated in FIG. 15, comprising:

an acquiring unit 151 configured to acquire a distance between an user of the display device and a display screen determined by a distance sensor, a judging and controlling unit 152 configured to control a fuzzy processing device when the distance between the user and the display screen is not greater than a predetermined value such that the fuzzy processing device carries out a fuzzy process on an image picture displayed on the display screen and the processed image picture is demonstrated to the user of the display device.

In a further embodiment, the judging and controlling unit 152 is configured to control the fuzzy processing device when the distance between the user and the display screen is greater than the predetermined value such that the fuzzy processing device stops the fuzzy process on the image picture.

In a further embodiment, the judging and controlling unit 152 is configured to control the fuzzy processing device when the distance between the user and the display screen is not greater than the predetermined value such that the fuzziness of the image picture displayed on the display screen increases as the distance between the user and the display screen is reduced.

Optionally, the judging and controlling unit 152 is configured to control the fuzzy processing device to diffuse the light emitted from the display screen when the distance between the user and the display screen is not greater than the predetermined value, and configured to control the fuzzy processing device to stop diffusing the light emitted from the display screen when the distance between the user and the display screen is greater than the predetermined value.

With reference to the above explanations to the embodiments, the skilled person in the art may clearly recognize that the embodiments of the present invention may be implemented by hardware, or may be implemented by combination of software and necessary general hardware platform. In view of this, the embodiments of the present invention may be embodied in form of software products which may be stored in a nonvolatile storage medium, for example a CD-ROM, a memory disk, a mobile hard disk drive, and may include several instructions implementing the method described as the embodiments of the present invention on a computer apparatus, for example, a personal computer, a server or a network apparatus.

The skilled person in the art would appreciate the attached drawings are only schematic views of some embodiments of the present invention, and the blocks or processes are not necessary for the invention.

As appreciated by the skilled person in the art, the units in the device of the embodiment of the present invention may be distributed in the device of the embodiment as discussed above, or may be adapted to be located in one or more devices other than the embodiments. The units of the above embodiment may be combined as one unit, or may further be divided into a plurality of sub-units.

The numbers of the embodiments of the present invention only describe orders, instead of representing the priority of the embodiments.

Although several exemplary embodiments have been shown and described, the present invention is not limited to those and it would be appreciated by those skilled in the art that various changes or modifications may be made in these embodiments without departing from the principles and spirit of the disclosure, which should fall within the scope of the present invention. The scope of the invention is defined by the claims and their equivalents.

What is claimed is:

1. A display device comprising:
   a distance sensor;
   a display screen;
   a controller which is at least one of a central process unit or a microcontroller on the main board of a TV, a computer or a tablet computer, and an internal control unit of the infrared sensor; and
   a fuzzy processing device which is at least one of a photoelectric element composed of liquid crystal/macromolecule composite materials, an electrochromic device, and electrowetting device, a charge particle device having the above function, and a light guide having a nanostructure and high transmission,
   wherein
   the display screen is configured to display an image picture,
   wherein the controller is configured to enable the fuzzy processing device which is connected with the controller when the distance measured by the distance sensor between the user of the display device and the display screen is not greater than a predetermined value such that the fuzzy processing device carries out a fuzzy process on the image picture displayed on the display screen and the processed image picture is demonstrated to the user of the display device;
   wherein the distance sensor is arranged on a front face of the display screen, and the display device further comprises a human body part recognition device which is implemented by hardware, or by combination of software and necessary general hardware platform and is configured to recognize a special part of the user, the distance sensor is configured to detect the distance between the special part of the user and a focal point of view lines of the user, and
   wherein the focal point of view lines of the user is an intersection point of the view lines of the user with the front face of the display screen, and the display screen demonstrates the image picture to the user through the front face of the display screen,
   wherein the distance sensor is configured to detect the distance between the special part of the user and the distance sensor and to detect a first angle and a distance between the distance sensor and the focal point of view lines of the user, and
   wherein the first angle is the angle between a connecting line of the distance sensor and the special part of the user and a connecting line of the distance sensor and the focal point of view lines of the user, and
   wherein the distance between the special part of the user and the focal point of view lines of the user is determined depending on the first angle, the distance between the special part of the user and the distance sensor and the distance between the distance sensor and the focal point of view lines of the user.

2. The display device according to claim 1, wherein the controller is further configured to control the fuzzy processing device when the distance between the user and the display screen is greater than the predetermined value such that the fuzzy processing device stops the fuzzy process on the image picture.

3. The display device according to claim 2, wherein the controller is configured to control the fuzzy processing device to diffuse the light emitted from the display screen when the distance between the user and the display screen is not greater than the predetermined value, and configured to control the fuzzy processing device to stop diffusing the light emitted from the display screen when the distance between the user and the display screen is greater than the predetermined value.

4. The display device according to claim 3, wherein the fuzzy processing device is any one of the following devices:
   a positive polymer dispersed liquid crystal device, a negative polymer dispersed liquid crystal device, a polymer network liquid crystal device and a macromolecule stabilized cholesteric liquid crystal device.

5. The display device according to claim 1, wherein the controller is further configured to control the fuzzy processing device when the distance between the user and the display screen is not greater than the predetermined value such that the fuzziness of the image picture displayed on the display screen increases as the distance between the user and the display screen is reduced.

6. The display device according to claim 1, wherein the display screen is an organic light emitting diode display screen and the fuzzy processing device is arranged on a side of the display screen, wherein an electroluminescent layer of the display screen emits an emergent light on the side.

7. The display device according to claim 6, wherein
   the fuzzy processing device is located outside of the display screen and arranged in a light emitting direction of the display screen;
   when the display screen is a top emission organic light emitting diode display screen, a package substrate in the display screen is one substrate of the fuzzy processing device; and
   when the display screen is a bottom emission organic light emitting diode display screen, a back substrate in the display screen is one substrate of the fuzzy processing device.

8. The display device according to claim 6, wherein the fuzzy processing device is a positive polymer dispersed liquid crystal device, and the display device comprises: a back substrate, a first electrode on the back substrate, the electroluminescent layer on the first electrode, a second electrode on the electroluminescent layer, a liquid crystal and macromolecule polymer mixture layer on the second electrode, a third electrode on the liquid crystal and macromolecule polymer mixture layer and a package substrate on the third electrode.

9. The display device according to claim 1, wherein the display screen is a liquid crystal display screen, and the fuzzy processing device is arranged on the side of a lower polarizer of the display screen facing a color filter substrate of the display screen, the lower polarizer being located on the side of an array substrate of the display screen facing away from the color filter substrate of the display screen.

10. The display device according to claim 9, wherein the display screen has a backlight unit located on the side of the lower polarizer of the display screen facing away from the array substrate of the display screen, and
wherein the fuzzy processing device is arranged on the side of an upper polarizer of the display screen facing away from the color filter substrate of the display screen and the upper polarizer in the display screen is one substrate of the fuzzy processing device, the upper polarizer being located on the side of the array substrate of the display screen facing the color filter substrate of the display screen.

11. The display device according to claim 9, wherein the fuzzy processing device is a positive polymer dispersed liquid crystal device, and the display device comprises: a backlight unit, the lower polarizer on the backlight unit, the array substrate on the lower polarizer, a liquid crystal layer on the array substrate, the color filter substrate on the liquid crystal layer, a fourth electrode on the color filter substrate, a liquid crystal and macromolecule polymer mixture layer on the fourth electrode, a fifth electrode on the liquid crystal and macromolecule polymer mixture layer and an upper polarizer on the fifth electrode; or
the display device comprises: a backlight unit, the lower polarizer on the backlight unit, a sixth electrode on the lower polarizer, a liquid crystal and macromolecule polymer mixture layer on the sixth electrode, a seventh electrode on the liquid crystal and macromolecule polymer mixture layer, the array substrate on the seventh electrode, a liquid crystal layer on the array substrate, the color filter substrate on the liquid crystal layer and an upper polarizer on the color filter substrate.

12. A display method comprising:
acquiring a distance between a user of a display device and a display screen of the display device determined by a distance sensor; and
controlling a fuzzy processing device which is at least one of a photoelectric element composed of liquid crystal/ macromolecule composite materials, an electrochromic device, an electrowetting device, a charged particle device having the above function, and a light guide having a nanostructure and high transmission when the distance between the user and the display screen is not greater than a predetermined value such that the fuzzy processing device carries out a fuzzy process on an image picture displayed on the display screen and the processed image picture is demonstrated to the user of the display device;
wherein the distance between the user and a display screen is equal to the distance between the special part of the user and the focal point of view lines of the user; and
wherein the focal point of view lines of the user is an intersection point of the view lines of the user with the front face of the display screen, and the display screen demonstrates the image picture to the user through the front face of the display screen,
wherein the distance sensor is configured to detect the distance between the special part of the user and the distance sensor and to detect a first angle and a distance between the distance sensor and the focal point view lines of the user, and
wherein the first angle between a connecting line of the distance sensor and the special part of the user and a connecting line of the distance sensor and the focal point of view lines of the user, and
wherein the distance between the special part of the user and the focal point of view lines of the user is determined depending on the first angle, the distance between the special part of the user and the distance sensor and the distance between the distance sensor and the focal point of view lines of the user.

13. The display method according to claim 12, further comprising:
controlling the fuzzy processing device when the distance between the user and the display screen is greater than the predetermined value such that the fuzzy processing device stops the fuzzy process on the image picture.

14. The display method according to claim 13, further comprising:
controlling the fuzzy processing device to diffuse the light emitted from the display screen when the distance between the user and the display screen is not greater than the predetermined value, and
controlling the fuzzy processing device to stop diffusing the light emitted from the display screen when the distance between the user and the display screen is greater than the predetermined value.

15. The display method according to claim 12, further comprising:
controlling the fuzzy processing device when the distance between the user and the display screen is not greater than the predetermined value such that the fuzziness of the image picture displayed on the display screen increases as the distance between the user and the display screen is reduced.

16. A display apparatus comprising:
an acquiring unit comprising a distance sensor,
a judging and controlling unit which is implemented by hardware, or by combination of software and necessary general hardware platform, and is connected with the acquiring unit and configured to enable a fuzzy processing device which is at least one of a photoelectric element composed of liquid crystal/macromolecule composite materials, an electrochromic device, an electrowetting device, a charged particle device having the above function, and a light guide having a nanostructure and high transmission, and is connected with the controller when the distance measured by the distance sensor of the acquiring unit between the user of the display device and the display screen is judged to be not greater than a predetermined value such that the fuzzy processing device carries out a fuzzy process on an image picture displayed on the display screen and the processed image picture is demonstrated to the user of the display device, and configured to disable the fuzzy processing device when the distance measured by the distance sensor of the acquiring unit between the user and the display screen is judged to be greater than the predetermined value such that the fuzzy processing device stops the fuzzy process on the image picture;
wherein the distance between the user and a display screen is equal to the distance between the special part of the user and the focal point of view lines of the user; and
wherein the focal point of view lines of the user is an intersection point of the view lines of the user with the front face of the display screen, and the display screen demonstrates the image picture to the user through the front face of the display screen, wherein the distance sensor is configured to detect the distance between the special part of the user and the distance sensor and to detect a first angle and a distance between the distance sensor and the focal point of view lines of the user, and wherein the first angle is the angle between a connecting line of the distance sensor and the special part of the user and connecting line of the distance sensor and the focal point of view lines of the user, and wherein the distance between the special part of the user and the focal point of view lines of the user is determined depending on the first angle, the distance between the special part of the user and the distance sensor and the distance between the distance sensor and the focal point of view lines of the user.

\* \* \* \* \*